United States Patent [19]

Hunt

[11] 4,218,997
[45] Aug. 26, 1980

[54] ACTUATOR DEVICES

[75] Inventor: Norman Hunt, Leamington Spa, England

[73] Assignee: Associated Engineering Limited, Warwickshire, England

[21] Appl. No.: 902,592

[22] Filed: May 4, 1978

[30] Foreign Application Priority Data

May 4, 1977 [GB] United Kingdom ............... 18747/77
Nov. 17, 1977 [GB] United Kingdom ............... 47992/77

[51] Int. Cl.$^2$ .......................... F02M 7/00; F02B 33/00
[52] U.S. Cl. ......................................... 123/352; 91/6; 91/450; 91/429; 180/179; 123/360
[58] Field of Search ..................... 180/105 E; 123/102, 123/103 R; 91/47, 48, 50, 449, 458, 459, 460, 6, 450, 429

[56] References Cited

U.S. PATENT DOCUMENTS

| | | | |
|---|---|---|---|
| 3,052,217 | 9/1962 | Denman et al. | 91/429 |
| 3,865,218 | 2/1975 | Jones | 91/6 |
| 3,946,707 | 3/1976 | Gray | 123/102 |

Primary Examiner—Ronald B. Cox
Attorney, Agent, or Firm—Biebel, French & Nauman

[57] ABSTRACT

The invention relates to an actuator device for a motor vehicle speed-responsive system, the device being operable to actuate the throttle valve or the like of the internal combustion engine of the vehicle. The actuator device comprises a bellows device defining a first chamber partly bounded by a movable wall and a fixed wall, and communicating with two further chambers defined by associated housings carried by the said fixed wall. One of the further chambers contains a first electromagnetic control valve fed by a D.C. voltage, and operable to control an orifice through which the first chamber communicates with atmosphere. The other of the further chambers contains a second electro-magnetic control valve fed both by said D.C. voltage and by a pulsed voltage, and operable to control both an orifice through which the first chamber communicates with atmosphere and an orifice through which the first chamber communicates with a source of gas at subatmospheric pressure.

8 Claims, 7 Drawing Figures

ACTUATOR DEVICES

The present invention relates to actuator devices, particularly for speed-responsive systems for motor vehicles, whereby the vehicle may be maintained at a predetermined speed. Such speed-responsive systems are disclosed in our British Patent Specifications Nos. 1,386,961 and 1,486,821.

Out British Patent Specification No. 1,486,822 discloses an actuator device comprising a chamber partly bounded by a movable wall and connected to atmosphere through a permanently open orifice, and an electromagnetic valve which is maintained in a closed position when de-energized and which controls the connection to said chamber of a volume of gas at other than atmospheric pressure, when said valve is open. The chamber comprises a relatively fixed wall and a relatively movable wall interconnected by a bellows, and a spring within said chamber to urge said bellows to an extended position, whereby the admission of gas at a reduced pressure to said chamber through said electromagnetic valve causes said bellows to contract against the force of said spring. The movement of the relatively movable wall with expansion or contraction of the bellows causes movement of the throttle valve or the like of an internal combustion engine to be controlled.

It has been found that under certain operational conditions the inflation rate of the bellows with atmospheric air in order to cause closure of the throttle valve is insufficient, and also that the actuator device does not inherently "fail safe", i.e. return to a closed throttle position, if the electromagnetic valve should jam for any reason, or if the valve return spring should fail, or the air orifice becomes blocked, or if an electrical fault should develop which cuts off the supply to the electromagnetic valve.

It is an object of the present invention to provide an improved construction of actuator device.

Accordingly, the present invention provides an actuator device comprising a first chamber partly bounded by a movable wall which is intended to be operative through a linkage to control the throttle valve, fuel injection pump rack, or other speed control device of an internal combustion engine, said first chamber communicating through a connection with at least one further chamber associated with two electro-magnetic control valves, one of which is arranged to be fed by a D.C. voltage and is operable to control an orifice which is connectable to atmosphere and the other of which is arranged to be fed both by said D.C. voltage and by a pulse voltage and is operable to control both an orifice which is connectable to atmosphere and an orifice which is connectable to a source of gas at sub-atmospheric pressure, such as the inlet manifold of an internal combustion engine. Preferably the first-mentioned orifice which is connectable to atmosphere is larger than the second-mentioned orifice which is connectable to atmosphere.

The two electro-magnetic control valves may be housed within a common second chamber, or two individual chambers, and each valve may comprise a movable armature which is biased by spring means to a position to maintain its associated orifice to atmosphere open when the valve is de-energised.

Preferably, the two electromagnetic control valves are mounted on the fixed wall of the first chamber. Advantageously, the armatures of these valves are housed in cavities formed in the fixed wall.

The invention will now be further described, by way of example, with reference to the accompanying drawings, in which.

Figure 7:
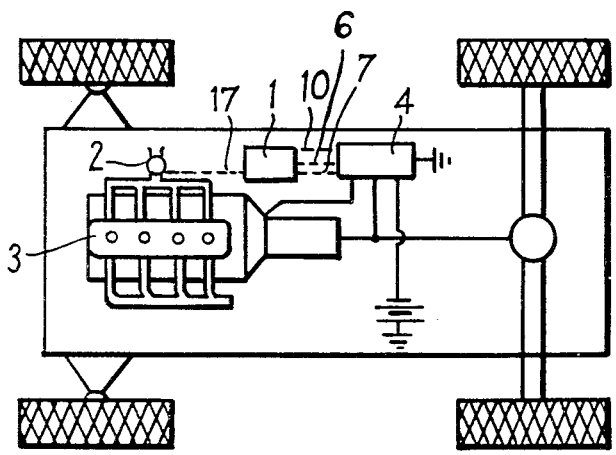
FIG. 7 is a schematic representation of a vehicle fitted with an actuator device as shown in FIGS. 1 to 6.
Figure 2:
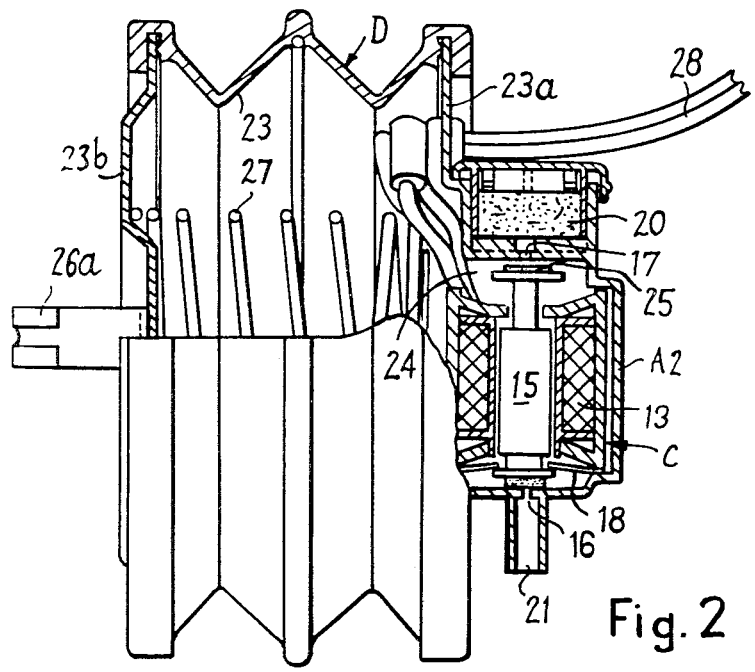
FIG. 2 is a side view, partly cut-away, of one practical embodiment of the actuator device of FIG. 1.
Figure 3:
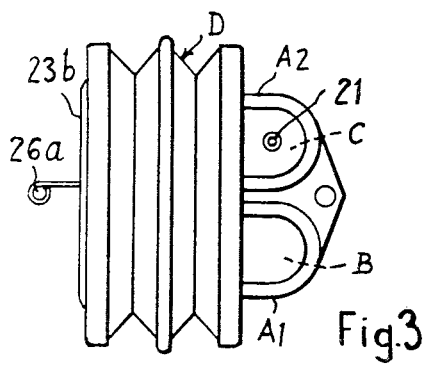
FIGS. 3 to 6 are, respectively, further side views and an end view, on a smaller scale, of the actuator device shown in FIG. 2.
Figure 4:
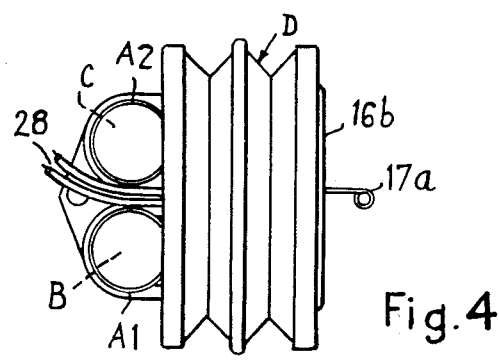
Figure 6:
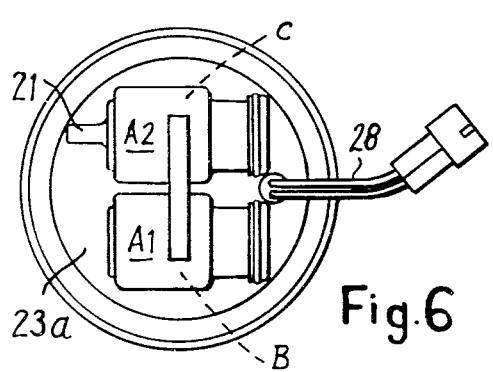
Figure 5:
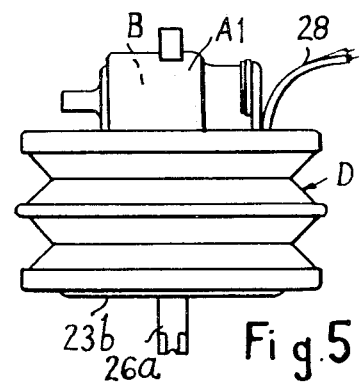

The actuator device shown in FIGS. 1 to 6 is intended to be employed in conjunction with, and form part of, a speed-responsive system for motor vehicles, such as is described in the aforementioned Specifications Nos.: 1,386,961 and 1,486,821, whereby a vehicle may be maintained at a predetermined speed. Briefly, as shown in FIG. 7, the actuator device 1 is connected to the carburettor throttle valve, fuel injection pump rack, or other speed control device or mechanism 2 associated with the inlet manifold of an internal combustion engine 3 of a road or other vehicle. The actuator device 1 controls the opening and closing of the throttle valve 2 in dependence upon signals from an electronic control circuit 4 of the speed-responsive system, which detects various operating parameters or conditions of the engine and/or vehicle.

Figure 1:
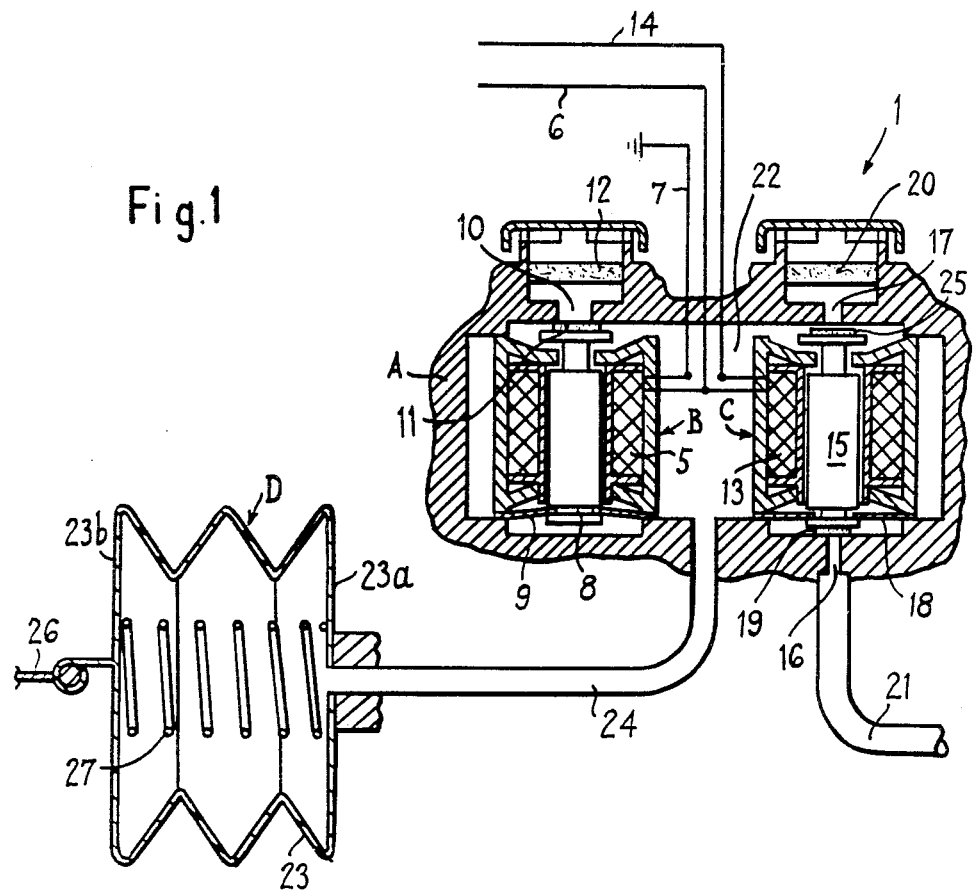
FIG. 1 is a diagrammatic cross-section of an actuator device according to the invention.

Referring to FIG. 1, the actuator device basically comprises a body A defining a chamber containing two electromagnetic control valves B and C, the chamber being connected to a bellows device D whose movement is employed to control the throttle valve 2 or the like of the internal combustion engine 3 (FIG. 7).

More specifically, the solenoid winding 5 of the electromagnetic control valve B is supplied with a D.C. voltage, e.g. in the range 12.5–18.0 volts, through a wire 6 from the control circuit 4 whenever the speed-responsive system is engaged to control the vehicle speed. A wire 7 is connected to a suitable earthing point on the vehicle to complete the circuit. In the engaged condition of the system, armature 8 is pulled upwards (as shown) by the energised solenoid winding 5 against the force exerted by a leaf spring 9, to close an orifice 10 in the body A by means of a valve or seal face 11. Orifice 10 is connected to atmosphere through a filter 12.

In the engaged condition of the speed-responsive system, the solenoid winding 13 of electromagnetic control valve C is also supplied with D.C. voltage through wire 6, and is connected to 0 volts D.C. by means of pulses at 20 Hz fed through wire 14. The mark-to-space ratio of these pulses is infinitely variable by means of the control circuit 4 of the speed-responsive system, between the limits of 0 milliseconds and 50.0 milliseconds (corresponding to fully "off" and fully "on" conditions).

The armature 15 is responsive to the pulses supplied to the solenoid winding 13 and moves between orifices 16 and 17 in proportion to the mark-to-space ratio of the pulses. As shown in the drawing, the armature 15 is drawn upwards by the electromagnetic force exerted against a leaf spring 18. The actual amount of movement and the time for which a lower valve or seal face 19 leaves orifice 16 is proportional to the pulse applied to solenoid winding 13. Orifice 17 is connected to atmosphere through a filter 20.

A pipe 21 connects orifice 16 to the inlet manifold of the internal combustion engine or some other sub-atmospheric pressure source. The pulses applied to armature 15 thus allow seal face 19 to pulse the air from the chamber 22 of body A and to bellows 23 of the device D, which is connected to the chamber by way of pipe 24, whilst also allowing air at atmospheric pressure to pulse through filter 20 and orifice 17 by way of a valve or seal face 25. The bellows have a relatively fixed wall 23a, and a relatively movable wall 23b which is connected through a wire 26, or similar linkage, to control the throttle valve 2 (FIG. 5) of the internal combustion engine. A spring 27 within the bellows urges the walls 23a and 23b away from each other.

Due to the flow rates, the overall volume of the space formed by the cavities within the chamber 22, within the pipe 24, and within the bellows 23, and also due to the response of the system so formed, these pulses are smoothed to provide a substantially steady pressure within the bellows 23, which may be varied between atmospheric pressure and the sub-atmospheric pressure in pipe 21 as a function of the pulse width applied through wire 14, to deflate or inflate the bellows under the action of the atmospheric pressure surrounding the bellows, and the return spring 27 urging the bellows to the inflated position. As viewed in FIG. 1, increasing the pulse width will cause the throttle control wire 26 to move to the right as the bellows contract, and decreasing the pulse width will cause the wire 26 to move to the left as the bellows expand.

The response characteristics required to produce smooth operation of the throttle wire 26 during control of vehicle speed are such that the maximum inflation rate of the bellows 23 by means of fully opening the orifice 17 is insufficient to satisfy specific regulations governing throttle closure under certain engine operating conditions. For this reason, the solenoid winding 5 may also be de-energised at such times, allowing additional air to be drawn in through filter 12 and orifice 10, thus reducing the inflation time for the bellows 23 and enabling the desired regulations to be satisfied. Additionally, the orifice 10 provides a fail-safe mechanism should the armature 15 jam for any reason in the upward position, since orifice 10 is arranged dimensionally to be sufficiently large to allow full inflation of the bellows 23 when the seal face 11 is retracted, even with the valve face 19 also fully retracted and allowing maximum gap at orifice 16 to the source of sub-atmospheric pressure.

Additionally, a further fail safe feature is provided by orifice 10 should any other electrical fault develop in the actuator device or its control circuit, since switching or fusing of the supply of the voltage to the solenoid winding 13 via wire 6 will also allow the leaf spring 9 to open orifice 10 and inflate the bellows 23 under the action of spring 27, thus restoring the throttle mechanism to the closed or off position.

FIGS. 2 to 6 show a practical embodiment of the actuator device shown schematically in FIG. 1, and corresponding parts have been designated by the same reference numerals. Thus, the actuator device of FIGS. 2 to 6 includes a bellows device D having a relatively movable wall 23b carrying a connector 26a connectable to the throttle valve controlling wire (not shown).

The fixed wall 23a is formed with housings A1 and A2 defining cavities or chambers respectively containing the two electro-magnetic control valves B and C, and which communicate directly with the interior of the bellows device D via connections or port 24. The two electromagnetic control valves B and C are arranged side-by-side within their respective cavities, only the valve C being visible in FIG. 2. The various connecting wires to supply the solenoid windings are included in the conductors 28 and through a connection made to the conductive wall 23a.

The construction of the practical embodiment of the present invention as shown in FIGS. 2 to 6 is compact and reduces the volume of air between the bellows chamber an the chambers housing the electro-magnetic control valves, thereby reducing the response time of the actuator device.

It will be understood that various modifications may be made without departing from the scope of the invention as defined in the appended claims. For example, the actuator device could be used to activate the internal combustion engine of a static device, such as a generator or compressor, instead of a vehicle, and in this case the electronic control system, if provided, would be operable to control the rotational speed of the engine. The mechanical linkage 26 could be replaced by a fluid, for example hydraulic or pneumatic equivalent. The valves B and C in FIGS. 2 to 6 could be housed in a common chamber carried by or formed on or in, the fixed wall of the bellows device.

I claim:

1. An actuator device comprising a first chamber partly bounded by a movable wall, said first chamber communicating through a connection with at least one further chamber associated with two electro-magnetic control valves, one of which is arranged to be fed by a D.C. voltage and is operable to control an orifice which is connectable to atmosphere, and the other of which is arranged to be fed both by said D.C. voltage and by a pulse voltage and is operable to control both an orifice which is connectable to atmosphere and an orifice which is connectable to a source of gas at sub-atmospheric pressure.

2. A device as claimed in claim 1, wherein the first-mentioned orifice which is connectable to atmosphere is larger than the second-mentioned orifice which is connectable to atmosphere.

3. A device as claimed in claim 2, wherein each electro-magnetic control valve comprises a movable armature which is biased by spring means to a position to maintain its associated orifice which is connectable to atmosphere open when the valve is de-energised.

4. A device as claimed in claim 3, wherein the first chamber comprises a fixed wall and said movable wall, which are interconnected by a bellows, and a spring within the bellows operable to urge them towards an extended position, the effect of a sub-atmospheric pressure through said connection being to cause said bellows to contract against the force of said spring.

5. A device as claimed in claim 4, wherein the two electro-magnetic control valves are mounted on the fixed wall of the first chamber.

6. A device as claimed in claim 5, wherein the fixed wall is formed with housing means defining two cavities, each forming a chamber housing the armature of one of the electro-magnetic control valves.

7. An actuator device comprising:
A. a bellows device including
 (i) a relatively fixed wall,
 (ii) an opposed relatively movable wall,
 (iii) a bellows interconnecting the two walls to define therewith a first chamber, and (iv) spring means normally operable to urge the two walls apart to expand the bellows, B. means to control the expansion and contraction of the bellows, including
 (i) housing means carried by said fixed wall and defining at least one second chamber communicating with said first chamber,
 (ii) first and second electro-magnetic control valves associated with said at least one second chamber,
 (iii) first and second orifices in said housing means to connect the first and second chambers to atmosphere, the first orifice having a larger cross-sectional area than the second orifice, and
 (iv) a third orifice to connect the first and second chambers to a source of sub-atmospheric pressure, C. the first electro-magnetic valve being, in operation, energisable by a D.C. voltage, and including
 (i) a first movable valve member cooperable with said first orifice to close the latter in the energised condition of the first valve, and
 (ii) spring means to bias said first valve member to a position to open the first orifice to atmosphere in the de-energised condition of the second valve the electro-magnetic valve being, in operation, energisable by said D.C. voltage and by a pulsed voltage, and including
 (i) a second movable valve member cooperable with said second orifice to close the latter in the energised condition of the second valve, and
 (ii) second spring means to bias the second valve member to a position to open the second orifice and close the third orifice in the de-energised condition of the second valve.

8. A vehicle powered by an engine, and fitted with a speed-responsive system including an electronic control circuit operable to sense the speed of the vehicle and produce a pulsed output which varies in dependence upon a comparison between the actual speed of the vehicle and a selected speed, and operable to produce a D.C. output, said outputs being applied to an actuator device connected to displace a speed change device of the engine, the actuator device comprising:

A. a bellows device including
 (i) a relatively fixed wall,
 (ii) an opposed relatively movable wall,
 (iii) a bellows interconnecting the two walls to define therewith a first chamber, and
 (iv) spring means normally operable to urge the two walls apart to expand the bellows, B. linkage means connecting said movable wall to the displaceable speed control device of the engine, whereby expansion of the bellows displaces the speed control device in a direction to reduce the engine speed, and contraction of the bellows displaces the speed control device in a direction to increase the engine speed, C. means to control the expansion and contraction of the bellows, including
 (i) at least one second chamber communicating with said first chamber,
 (ii) first and second electro-magnetic control valves associated with said at least one second chamber,
 (iii) first and second orifices in said at least one second chamber to connect the first and second chambers to atmosphere, the first orifice having a larger cross-sectional area than the second orifice, and
 (iv) a third orifice to connect the first and second chambers to a source of sub-atmospheric pressure comprising the inlet manifold of the engine, D. the first electro-magnetic valve being connected to the electronic control circuit so as to be energised by the D.C. output thereof, and including
 (i) a first movable valve member cooperable with said first orifice to close the latter in the energised condition of the first valve, and
 (ii) spring means to bias said first valve member to a position to open the first orifice to atmosphere in the de-energised condition of the first valve, E. the second electro-magnetic valve being connected to the electronic control circuit so as to be energised by the D.C. output thereof, and also by the pulsed output thereof, and including
 (i) a second movable valve member cooperable with said second orifice to close the latter in the energised condition of the second valve, and
 (ii) second spring means to bias the second valve member to a position to open the second orifice and close the third orifice in the de-energised condition of the second valve.

* * * * *